(12) United States Patent
Mori

(10) Patent No.: US 6,711,419 B1
(45) Date of Patent: Mar. 23, 2004

(54) INTEGRATED INFORMATION APPLIANCE

(75) Inventor: Robert F. Mori, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 680 days.

(21) Appl. No.: 09/615,366

(22) Filed: Jul. 13, 2000

(51) Int. Cl.[7] .............................................. H04M 1/00
(52) U.S. Cl. ................... 455/556.1; 455/557; 455/66.1
(58) Field of Search ............................. 455/557, 556.1, 455/556.2, 66.1, 74, 90.3; 379/446, 447; 358/473, 474

(56) References Cited

U.S. PATENT DOCUMENTS

| | | | |
|---|---|---|---|
| 5,231,663 A | 7/1993 | Earl et al. | 380/18 |
| 5,900,875 A | 5/1999 | Haitani et al. | 345/349 |
| 5,929,435 A | 7/1999 | Han | 250/234 |
| 6,049,636 A | 4/2000 | Yang | 382/289 |
| 6,055,070 A | 4/2000 | Kang | 358/497 |
| 6,057,944 A | 5/2000 | Takeuchi | 358/468 |
| 6,073,031 A * | 6/2000 | Helstab et al. | 455/557 |
| 6,405,049 B2 * | 6/2002 | Herrod et al. | 455/517 |
| 6,587,675 B1 * | 7/2003 | Riddiford | 455/557 |

OTHER PUBLICATIONS

Athens PC Article entitled Microsoft and HP Unveil 'Athens' PC Prototype, May 7, 2003, 3 pages.
"The Porticle", http://www.qbenet.com/popup–qbe.htm, found on internet on May 10, 2000, 1 page.
"Qubit Technology", http://www.qubit.net, found on internet on May 10, 2000, Copyright 1999–2000 Qubit Technology, 2 pages.
Etown, "Screenfridge Keeps You Well Stocked", http://community.etown.com/news/articles/screenfridge03241999msa.html, found on internet on May 10, 2000, 3 pages.

* cited by examiner

Primary Examiner—Lee Nguyen
(74) Attorney, Agent, or Firm—Rosenthal & Osha L.L.P.

(57) ABSTRACT

An integrated information appliance includes a central processing unit for executing an action in response to a user request, a storage for storing information for use by the central processing unit in responding to the user request, and a cradle which includes a scanning device for scanning an image and storing the scanned image in the storage. An information pad is removably mounted on the cradle. The information pad includes a screen display for displaying information to a user and for receiving information and requests from the user and a plurality of application buttons for sending a request to the central processing unit to perform a specific action.

22 Claims, 15 Drawing Sheets

INTEGRATED INFORMATION APPLIANCE

BACKGROUND OF THE INVENTION

Personal computers and other electronic computing devices are fast becoming commonplace items in many home environments. This is primarily due to the decreasing cost of computer processors and memory. Many home computer users equip their personal computers with software applications and hardware that allow them to communicate with the outside world, organize their activities, obtain information, and conduct transactions with service providers. Some home computer users also have facsimile machines, which allow them to send and receive faxes, and optical scanners, which allow them to scan printed documents and store the scanned images on their personal computers or some other removable magnetic memory for subsequent use. Many of the personal computers currently found in home environments are desktop computers. These desktop computers are typically bulky and are located in an office or study room within the home. Because desktop computers are typically not readily accessible when needed, home users are now buying laptop computers which can be moved around the home more easily than desktop computers. Mobile electronic computing devices which perform specific functions such as information management and connection to the Internet are also finding their way into many homes.

U.S. Pat. No. 5,900,875 issued to Haitani et al. discloses a palmtop computer system which allows a user to perform personal informational management tasks. As shown in FIG. 1, the palmtop computer system 2 includes a screen display area 4 and a user input area 6. The screen display area 4 is used for displaying information to a user. The user input area 6 is used to input text in a writing area 8 and to interact with application buttons 10. The screen display area 4 and the user input area 6 are covered with a touch sensitive digitizer pad that can detect user interaction with a stylus or finger. Below the user input area 6 are mechanical buttons 14–28. The mechanical button 14 turns the palmtop computer system 2 on or off. The mechanical buttons 18–24 display a calendar application, an address book application, a To-do list application, and a note pad application, respectively. The mechanical buttons 26–28 provide scrolling functions for the screen display area. Information can be uploaded to and downloaded from the palmtop computer system 2 through a serial interface connector (not shown) at the rear end of the palmtop computer system 2.

Unlike desktop and notebook computers, the palmtop computer system 2 does not require an extensive "boot-up" session and, therefore, provides quick access to information. The palmtop computer system 2 is primarily used for managing personal information such as address books and for scheduling activities. There are other portable electronic computing systems besides notebook computers which provide more of the functionalities associated with personal computers. For example, Aqcess Technologies, Inc., provides much of the functionalities of a personal computer in a mobile, lightweight, clipboard-sized workstation sold under the trademark Qbe (pronounced "cube"). RSC provides a pad-like computer system, sold under the trademark WebPAD, that allows wireless connection to the Internet. Qubit Technology provides another portable computer system, sold under the trademark Qubit, that allows wireless connection to the Internet. Because these portable devices do not integrate many of the functions required by home users, a home user looking for easy accessibility to information and service providers and the ability to organize activities and communicate quickly with the outside world will have to buy a number of electronic gadgets, each performing one or more specific functions.

Some home appliances are starting to have many of the functions described above built into them. The idea is that these appliances can be located in a natural place for much of the activities in the home, thus decreasing the need for portable personal computing devices. For example, Electrolux recently introduced a smart refrigerator, called ScreenFridge, which has a computer, a liquid-crystal-display (LCD) touch screen, and a bar code scanner built into one of its doors. The barcode scanner can swipe a barcode on an item and add the item to a digital shopping list, which can then be sent to a supermarket of choice using a telephone modem. Household members can send and receive email messages or surf the Internet. The refrigerator is equipped with speakers, a microphone, and a small video camera so as to allow one household member to leave video messages for another household member. All the functions of the ScreenFridge are available through the LCD touch screen and a virtual keyboard. The computer and LCD touch screen are integrated with the refrigerator and are, therefore, not portable.

SUMMARY OF THE INVENTION

In one aspect, the invention is an integrated information appliance which comprises a central processing unit for executing an action in response to a user request, a storage for storing information for use by the central processing unit in responding to the user request, and a cradle having a scanning device for scanning an image and storing the scanned image in the storage. The integrated information appliance further includes an information pad which is removably mounted on the cradle. The information pad comprises a screen display for displaying information to a user and for receiving information and requests from the user and a plurality of application buttons for sending a request to the central processing unit to perform a specific action.

In some embodiments, the integrated information appliance includes a phone base station which communicates with the central processing unit and a phone which receives communication signals from the phone base station. In some embodiments, the integrated information appliance includes a network connection means for converting information from the appliance to a form suitable for transportation over a network. In some embodiments, the integrated information appliance includes a printer which is connected to receive print requests from the central processing unit.

Other aspects and advantages of the invention will be apparent from the following description and the appended claims.

DETAILED DESCRIPTION OF THE INVENTION

Embodiments of the invention provide an integrated information appliance which has an easy-to-use interface that allows a user to communicate with other people, organize activities, obtain information, and conduct transactions with service providers. The appliance is portable, but can be mounted in any easily accessible location. For example, in an home environment, the appliance can be mounted on the door of a refrigerator or on a wall in the kitchen. The appliance is also suitable for use in places other than the home where easy accessibility to information and service providers and the ability to communicate quickly with other people are important.

Figure 2:
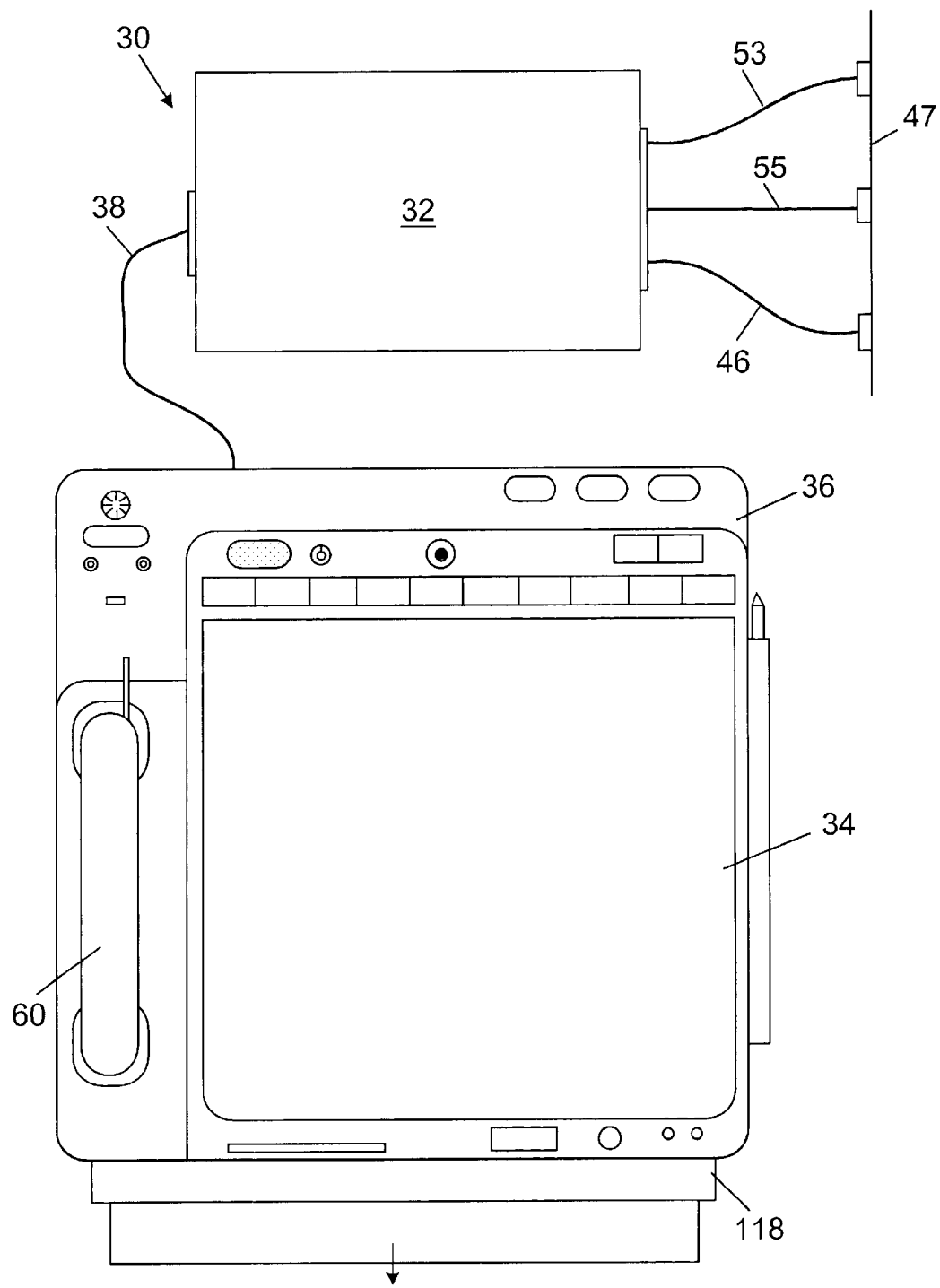
FIG. 2 is an illustration of an integrated information appliance according to one embodiment of the invention.

Various embodiments of the invention will now be described with reference to the accompanying figures. FIG. 2 illustrates an integrated information appliance 30 which comprises a portable computer 32, an information pad 34, and an electronic cradle 36. The information pad 34 is mounted on the electronic cradle 36 in the illustration, but may be detached from the electronic cradle 36 as needed. The electronic cradle 36 may be mounted in any easily accessible location such as the door of a refrigerator (not shown) or a wall in the kitchen (not shown). The portable computer 32 may be mounted in any suitable location, either close to the electronic cradle 36 or in a remote location. In an alternate embodiment, the portable computer may be embedded in the electronic cradle 36. The electronic cradle 36 communicates with the portable computer 32 through a cable 38. When the information pad 34 is coupled to the electronic cradle 36, the information pad 34 communicates with the portable computer 32 through the electronic cradle 36. When the information pad 34 is detached from the electronic cradle 36, the information pad 34 communicates with the portable computer 32 via a wireless radio link (not shown).

Figure 3:
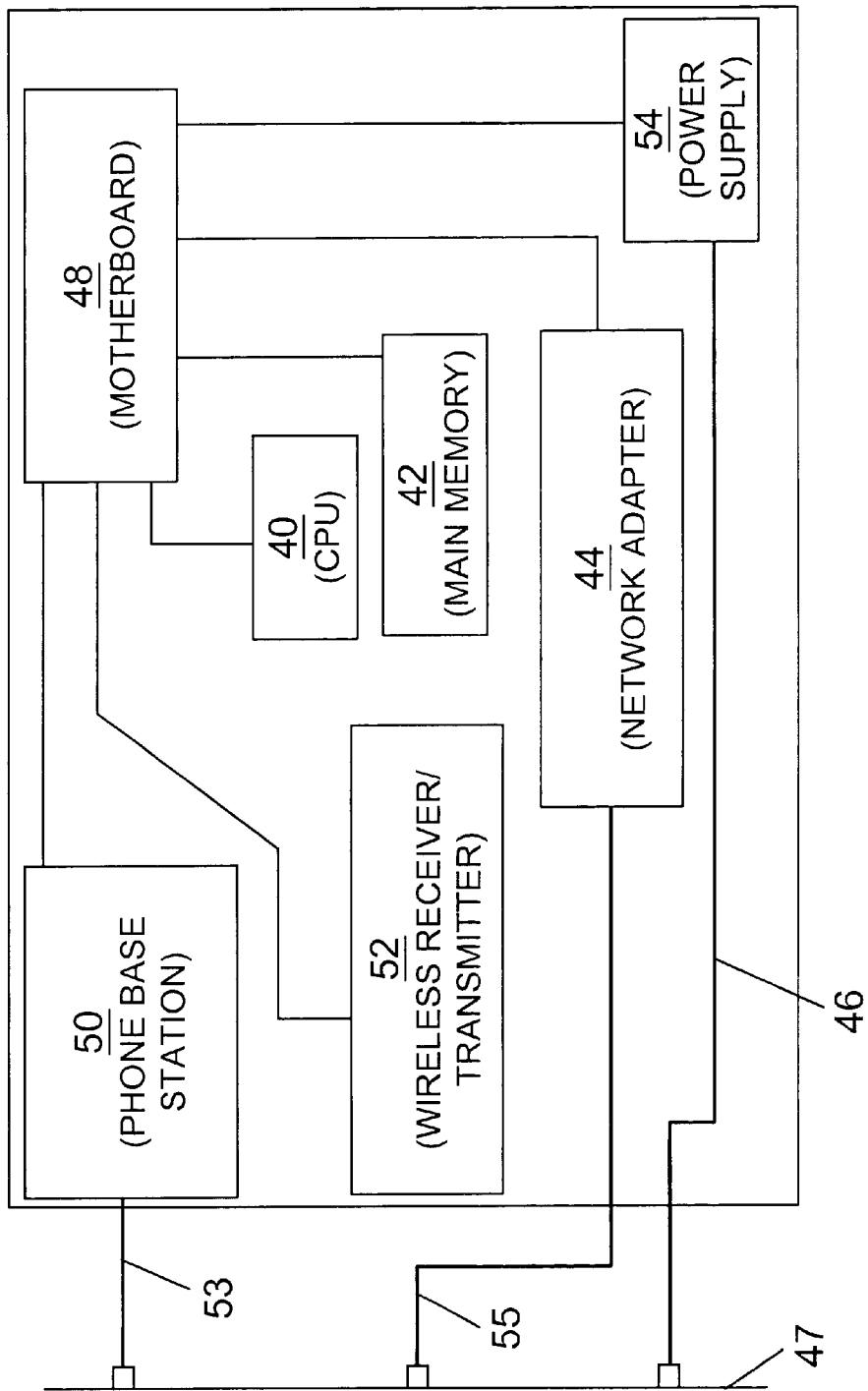
FIG. 3 is a block diagram of the portable computer shown in FIG. 2 according to one embodiment of the invention.

FIG. 3 shows a block diagram of the portable computer 32 according to one embodiment of the invention. As illustrated, the portable computer 32 includes a central processing unit (CPU) 40, a storage 42, and a network adapter 44, e.g., an Ethernet card. The portable computer 42 may optionally include a modem (not shown). The network adapter 44 (and/or the modem) allows connection to a network, e.g., the Internet. The CPU 40, the storage 42, and the network adapter 44 are all connected to a motherboard 48. The portable computer 32 also includes a phone base station 50, a wireless receiver/transmitter 52, and a power supply 54, all of which are connected to the motherboard 48. A cable 46 is provided to connect the power supply 54 to a power outlet in the wall 47. Cable 53 is provided to connect the phone base station 50 to a phone jack in the wall 47, and cable 55 connects the network adapter 44 to a socket in the wall 47 or a device providing network access, e.g., cable/DSL modem. The motherboard 48 is connected to the electronic cradle 36 by the cable 38 (also shown in FIG. 2).

Figure 4:
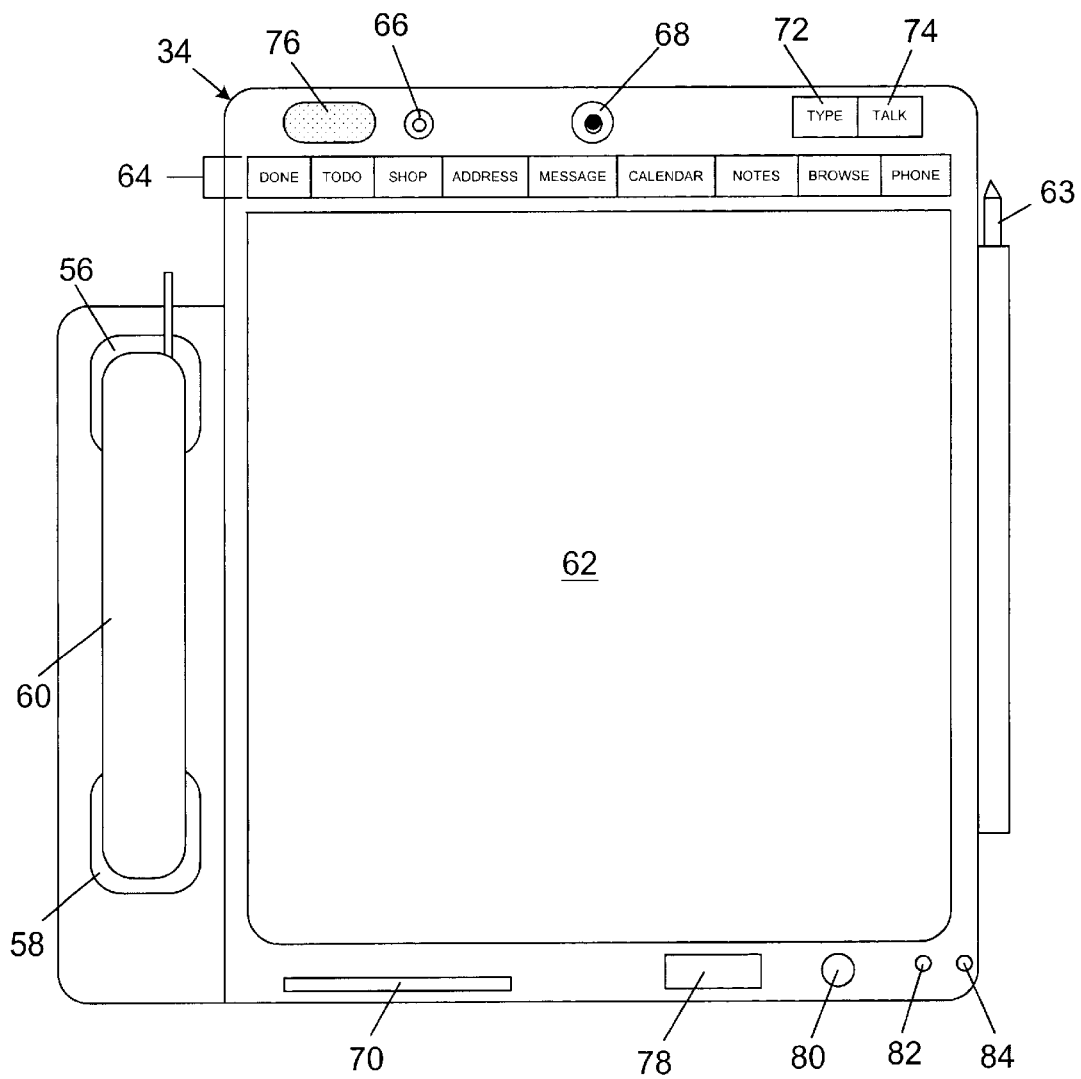
FIG. 4 is an enlarged view of the information pad shown in FIG. 2.

FIG. 4 shows an enlarged view of the information pad 34. The top surface 57 of the information pad 34 includes recesses 56 and 58 which are adapted to retain a hand-held phone 60. The recess 58 includes contact points (not shown) for charging a battery pack (not shown) in the hand-held phone 60. The hand-held phone 60 receives communication signals from the phone base station 50 (shown in FIG. 3) in the portable computer 32. The information pad 34 also includes a screen display 62, e.g., a liquid crystal display (LCD), for displaying information to the user. In one embodiment, the screen display 62 is covered with a clear, touch-sensitive digitizer pad that can detect user interaction with a stylus 63 or finger. An array of application buttons 64 is arranged above the screen display 62. When a button in the array of application buttons 64 is activated, a signal is sent to the CPU 40 to perform a specific action. The exact number of buttons in the array of application buttons 64 will depend on user requirements. A specific combination of application buttons will be discussed later.

A power button 66 is located above the screen display 62. The power button 66 is used to turn the screen display 62 on or off. In one embodiment, the information pad 34 includes a digital camera 68 and a microphone array 70, e.g., a far field microphone. The digital camera 68 and the microphone array 70 can be used to record video messages. The microphone array 70 can be combined with voice recognition applications to allow the information pad 34 to receive and respond to verbal commands. The information pad 34 includes a "TYPE" button 72 and a "TALK" button 74 which allow the user to choose the mode for interacting with the screen display 62. The information pad 34 also includes a speaker 76. In one embodiment, the information pad 34 includes a transmitter/receiver port 78, e.g., Infrared Data Association (IrDA) port, which allows the portable computer 32 to exchange data with other electronic devices, e.g., a personal digital assistant (PDA), a cellular phone, a desktop or laptop computer, or a printer. The information pad 34 may also include a fingerprint reader 80 for user identification. The information pad 34 is provided with LED indicators 82 and 84.

Figure 5:
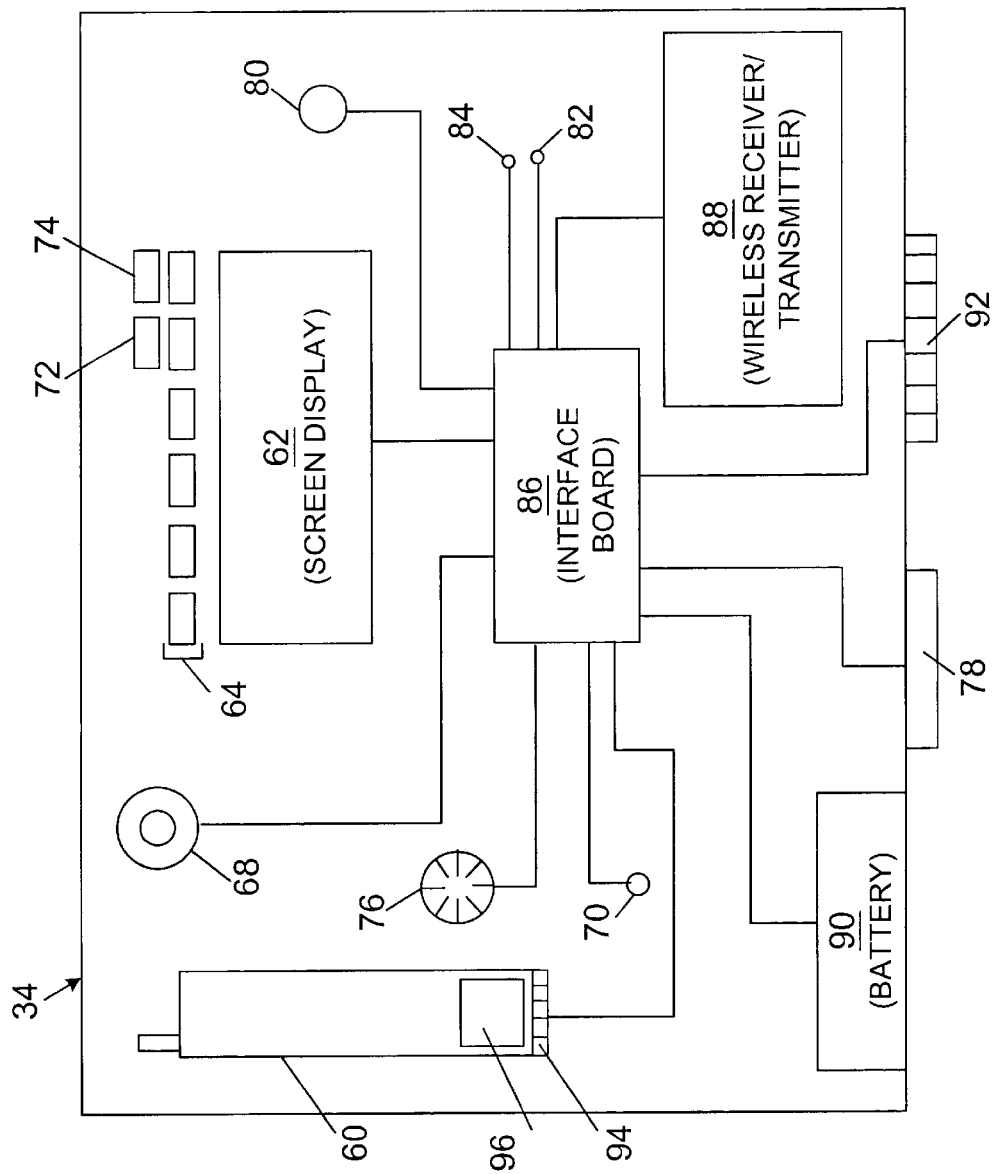
FIG. 5 is a block diagram of the information pad shown in FIG. 4.

FIG. 5 shows a block diagram of the information pad 34. The screen display 62, the array of buttons 64, the microphone array 70, the digital camera 68, the TYPE button 72, the TALK button 74, the speaker 76, the IrDA port 78, and the fingerprint reader 80 are all connected to an interface board 86. The interface board 86 could be, for example, a printed circuit board with Ethernet card. Although the interface board 86 is not limited to printed circuit boards with Ethernet card. The information pad 34 also includes a wireless receiver/transmitter 88 for receiving signals from and transmitting signals to the wireless receiver/transmitter 52 (shown in FIG. 3) and a battery pack 90 for powering the screen display 62 when the information pad 34 is not mounted on the electronic cradle 36 (shown in FIG. 2). The information pad 34 also includes communication/contact tabs (or port) 92. The communication/contact tabs 92 are located on the underside of the information pad 34 so that when the information pad 34 is mounted on the electronic cradle 36 (shown in FIG. 2) the communication/contact tabs 92 are electrically connected to similar communication/contact tabs on the electronic cradle 36. In this way, information can be sent to the information pad 34 through the communication/contact tabs 92. Also, the battery pack 90 can be charged through the communication/contact tabs 92. The contact tabs 94 for charging a battery pack 96 in the hand-held phone 60 are also connected to the interface board 86. The LED indicators 82 and 84 are connected to the interface board 86. The LED indicator 82 may glow when the battery pack 90 is low, and the LED indicator 84 may glow when the screen display 62 is on.

Figure 6:
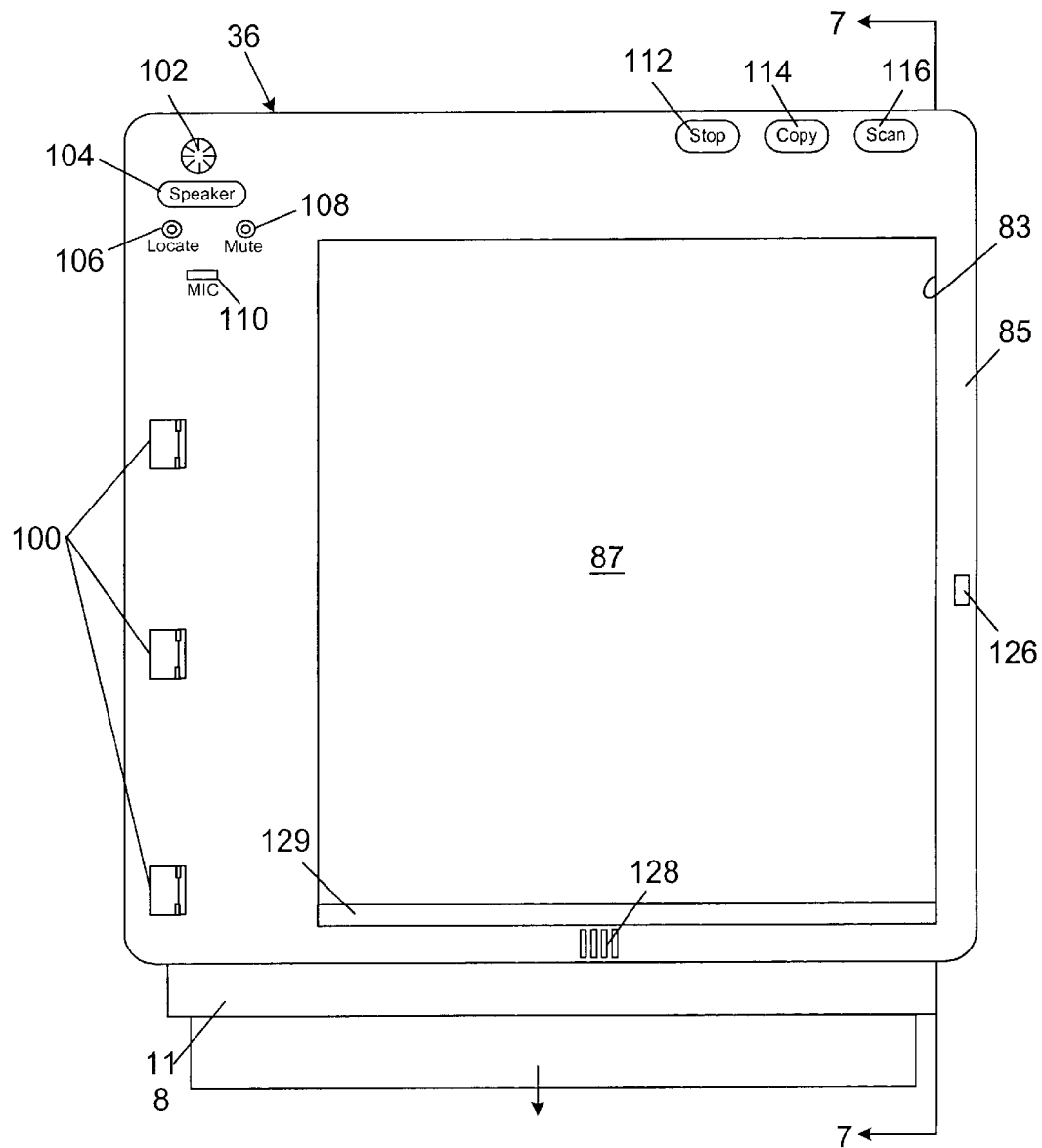
FIG. 6 is an enlarged view of the electronic cradle shown in FIG. 2.
Figure 7:
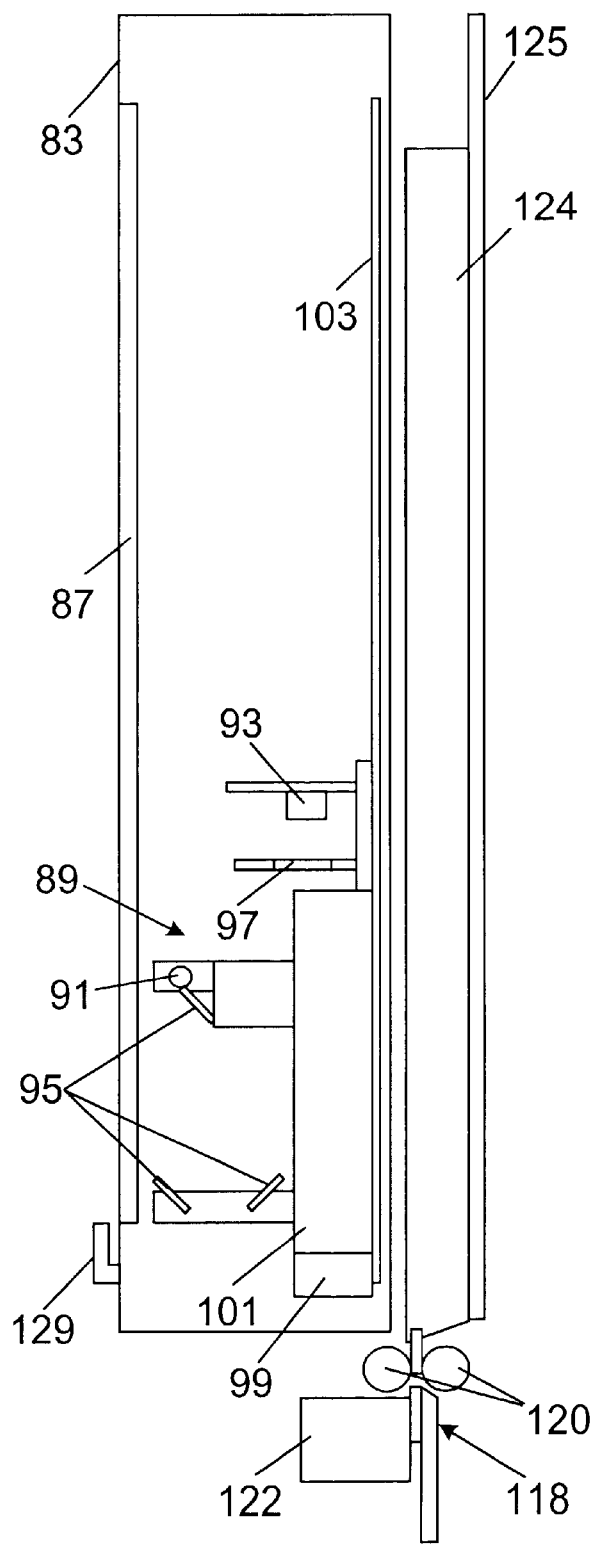
FIG. 7 is a cross section of the electronic cradle shown in FIG. 6.

FIG. 6 shows an enlarged view of the electronic cradle 36 previously shown in FIG. 2. The electronic cradle 36 includes a housing 83 which is provided with an opening 85. A reflective plate 87 is secured within the opening 85. Underneath the reflective plate 87 is an optical scanner (not shown). The optical scanner may be any of the conventional optical scanners used in flatbed scanners, e.g., CanoScan FB 620P sold by Canon Computer Systems, Inc. In general, the optical scanner includes a light source for illuminating a document (not shown) on the reflective plate 87 and a detector for detecting a beam reflected from the reflective plate 87. FIG. 7 shows one configuration of an optical scanner 89 which includes a light source 91 and an optoelectronic transducer 93, e.g., a charge coupled device (CCD). The optical scanner 89 includes a plurality of mirrors 95 and a convergent lens 97 for transmitting the beam reflected from the reflective plate 87 to the transducer 93. The optical scanner 89 is translated along the reflective plate 87 to scan a document (not shown) on the reflective plate 87. The translation of the optical scanner 89 may be achieved in any conventional manner. For example, a stepper motor 99 may move a platform 101 on which the optical scanner 89 is mounted along a set of rails 103.

The electronic cradle 36 also includes a printer 118 mounted at the rear end of the housing 83. The printer 118 could be any of the commercially available portable printers. It is important that the printer is compact so that the electronic cradle 36 is not too bulky. In one embodiment, the printer 118 is an inkjet printer. The printer 118 includes a pair of printer rollers 120, an inkjet cartridge 122, and a paper tray 124 for feeding paper to the printer rollers 120. Referring back to FIG. 6, the electronic cradle 36 includes a speakerphone 102, a "SPEAKER" button 104 for turning the speakerphone on or off, a "LOCATE" button 106, a "MUTE" button 108, and a microphone 110. The speakerphone 102, the SPEAKER button 104, the LOCATE button 106, the MUTE button 108, and the microphone 110 are all part of the phone service, as will be subsequently explained. "STOP" button 112, "COPY" button 114, and "SCAN" button 116 are provided on the housing 83, above the reflective plate 87. The "STOP" button 112 places the electronic cradle 36 in standby mode. The "COPY" button 114 places the electronic cradle 36 in copy mode. The "SCAN" button 116 places the electronic cradle 36 in scan mode.

Figure 8:
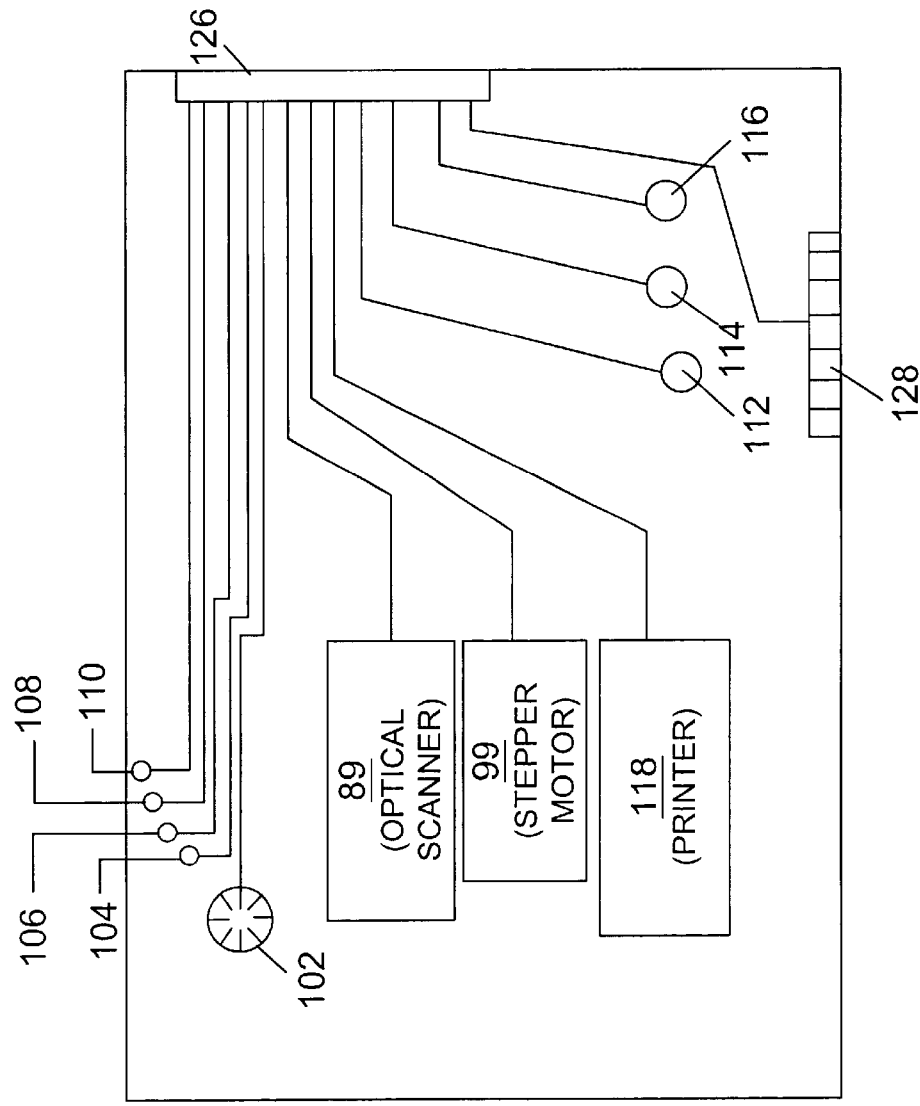
FIG. 8 is a block diagram of the electronic cradle shown in FIGS. 6 and 7.

FIG. 8 shows a block diagram of the electronic cradle 36. The printer 118, the optical scanner 89, and the means for translating the optical scanner 89 along the reflective plate 87, e.g., the stepper motor 99, are connected to the motherboard 48 through an electrical connector 126. The speaker 102, the speaker button 104, the locate button 106, the mute button 108, and the microphone 110 are also connected to the motherboard 48. In the copy and scan mode, the stepper motor 96 receives signals from the CPU 40 to move the optical scanner 82 along the rails 98 so that the optical scanner 87 can capture the image of a document on the reflective plate 86. In the scan mode, the scanned image is stored in the storage 42 so that the CPU 40 can access it. In the copy mode, the scanned image is sent to the printer 118 for printing. The CPU 40 sends signals to the stepper motor 96 in response to user input via the screen display 62 (shown in FIG. 4) of the information pad 34. The STOP, COPY, and SCAN buttons 112–116 are also connected to the motherboard 48. The buttons 112–116 send stop, copy or scan signals, respectively, to the CPU 40 (shown in FIG. 3) when activated, and the CPU 40 in turn responds by moving the stepper motor 96 to the copy or scan position or returning the stepper motor 96 to the default position. The electronic cradle 36 includes communication/contact tabs 128 which are connected to the motherboard 48 through the electrical connector 126.

Referring to FIG. 7, a mounting member 125 is provided at the base of the paper tray 124. In the illustrated embodiment, the mounting member 125 is a magnet assembly which can be mounted on a suitable surface, such as a refrigerator door. Alternatively, the mounting member 125 may be a bracket (not shown) which may be mounted on a surface, e.g., a wall, or any other suitable mounting means. Referring to FIG. 6, hinges 100 are provided on the housing 83. The hinges 100 may be used to couple with slots (not shown) in the bottom surface of the information pad 34 so that the information pad 34 acts as a door to the reflective plate 87. The housing 83 is provided with a ledge 129 so that a paper (not shown) placed on the reflective plate 87 stays in place even when the information pad 34 is not coupled to the housing 83. A magnet 126 is also provided on the housing 83 which cooperates with a surface on the information pad 34 so that the information pad 34 can be secured to the electronic cradle 36. Of course, other suitable means for securing the information pad 34 to the electronic cradle 36, such as a clip, can be used. The communication/contact tabs 128 (shown in FIGS. 6 and 8) on the electronic cradle 36 cooperate with the communication/contact tabs 92 (shown in FIG. 5) on the information pad 34 when the information pad 34 is secured to the electronic cradle 36. In this way, electrical power and communication signals can be transmitted to the information pad 34 through the communication/contact tabs 92, 128.

In order to explain the operation of the integrated information appliance 30, it is useful to consider the interaction buttons 72, 74, and a specific configuration of the array of application buttons 64 (shown in FIG. 4) on the information pad 34. The TYPE button 72 displays a virtual keypad on the screen display 62 and allows the user to select the characters for input using a finger or stylus. The input is complete when the user presses the DONE button on the virtual keypad. The textual input is then placed at the position of the insertion point (the currently active input field). When the TALK button 74 is pressed, the system activates the voice recognizer in one of two modes. If the input field is a fixed type, i.e., the possibilities are predetermined, or if command buttons are visible, the voice recognizer uses a discrete algorithm to determine the intended user input. If the input is not pre-determined, e.g., if the content is the body of a mail message or a fax, then a continuous recognition algorithm is used. In one embodiment, the user may select text in error, using a finger or a stylus, and again press the TALK button 74 to dictate an alternative to the selected text.

Figure 9:
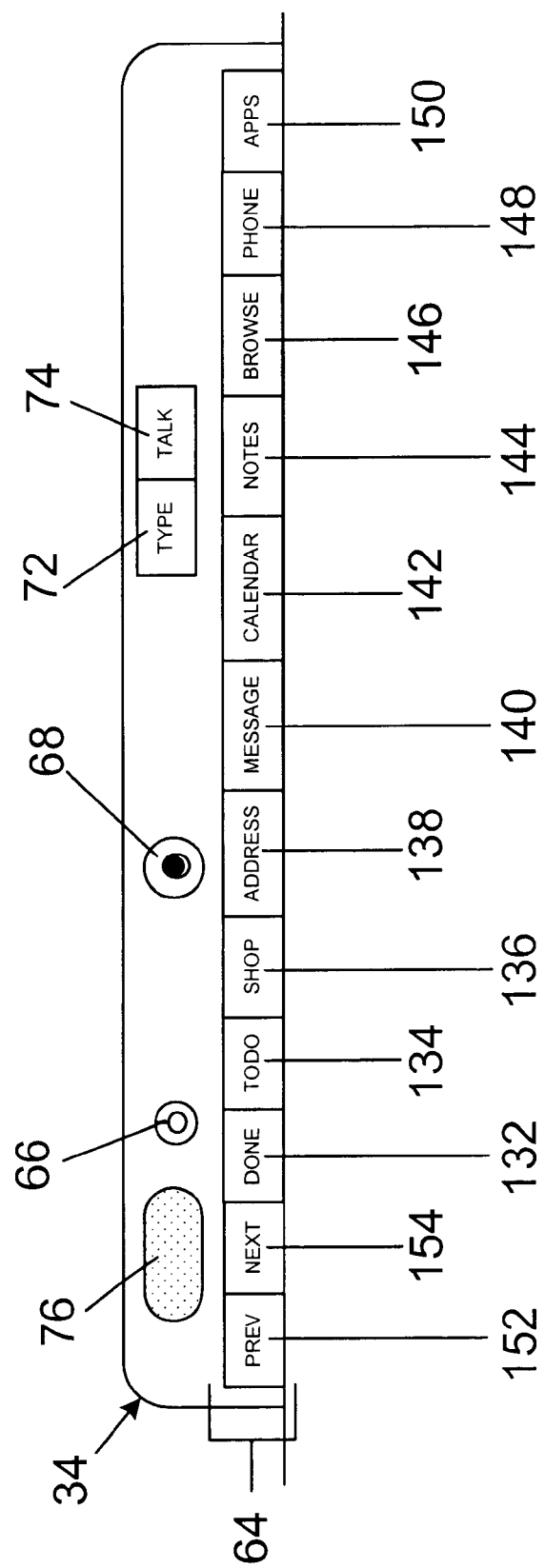
FIG. 9 shows an array of application buttons in accordance with one embodiment of the invention.
Figure 10:
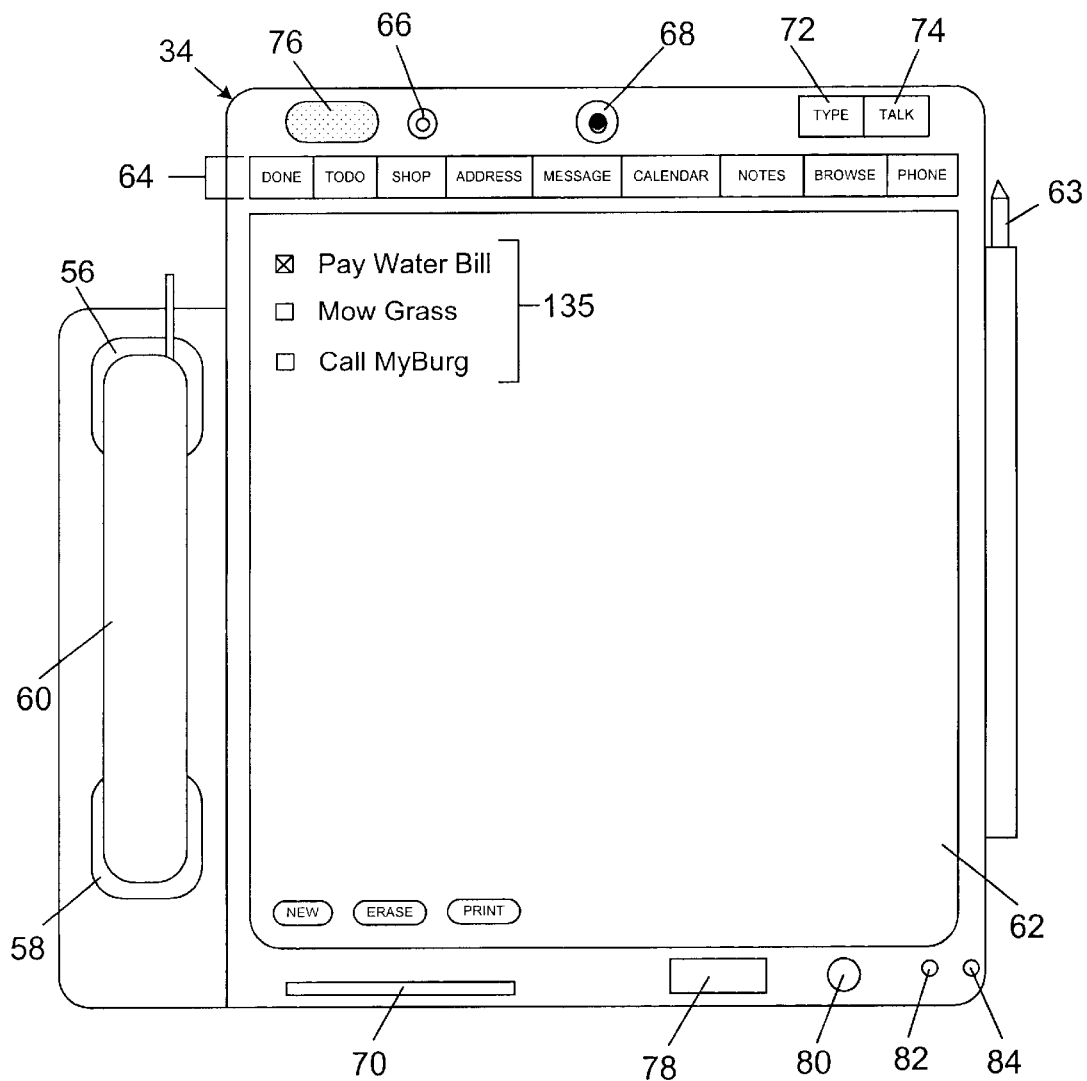
FIG. 10 shows a To-do list on a screen display of the information pad previously shown in FIG. 4 in accordance with one embodiment of the invention.
Figure 11:
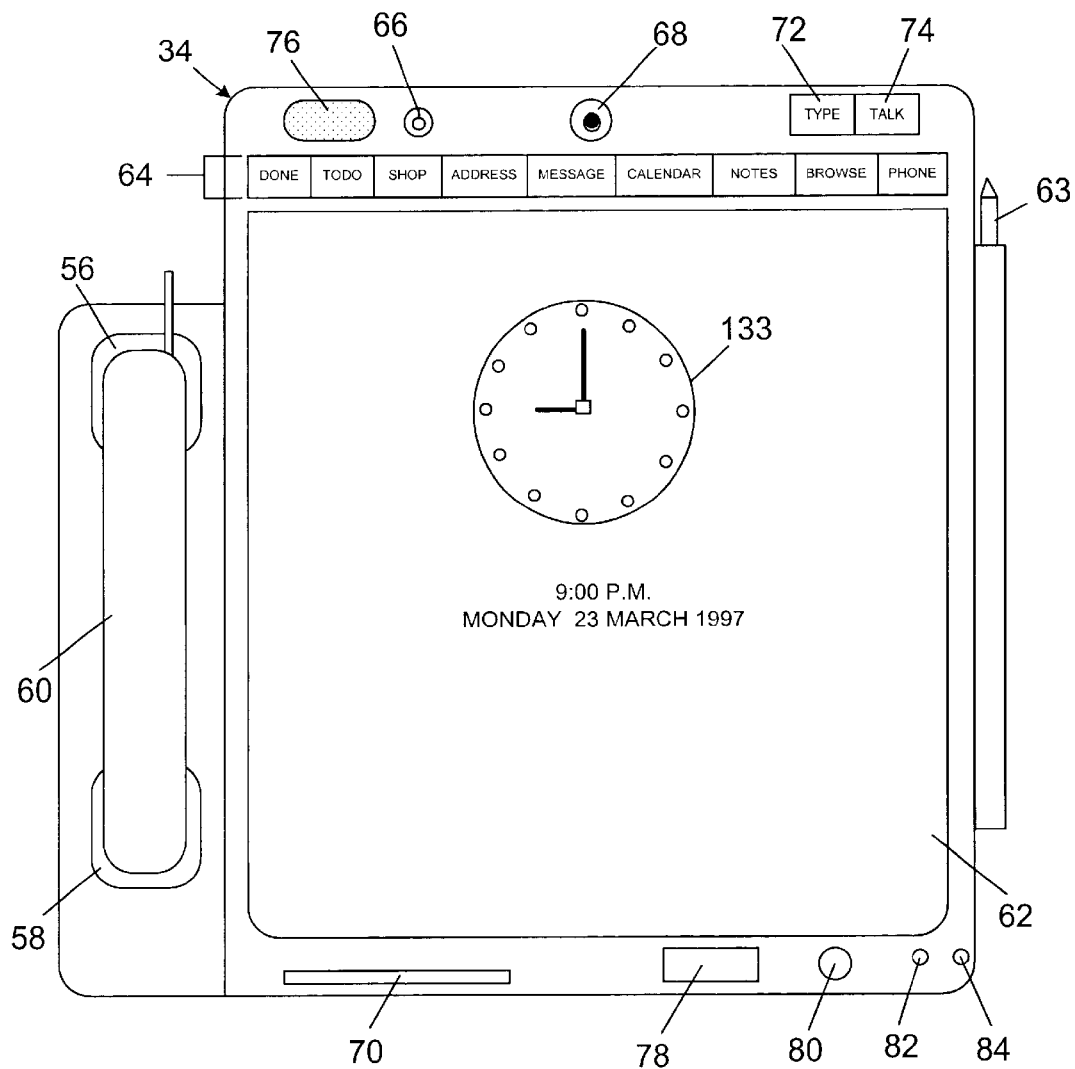
FIG. 11 shows a clock on a screen display of the information pad previously shown in FIG. 4 in accordance with one embodiment of the invention.

In one embodiment, as shown in FIG. 9, the array of application buttons 64 includes a "DONE" button 132, a "TODO" button 134, a "SHOP" button 136, an "ADDRESS" button 138, a "MESSAGE" button 140, a "CALENDAR" button 142, a "NOTES" button 144, a "BROWSE" button 146, a "PHONE" button 148, an "APPS" button 150, a "PREV" button 152, and a "NEXT" button 154. As previously explained, when the buttons in the array of application buttons 64 are activated, a signal is sent to the CPU 40 (shown in FIG. 3) to perform a specific action. The TODO button 134 starts up a To-do list application when activated and displays a To-do list 135 on the screen display 62, as illustrated in FIG. 10. When the To-do list is displayed, the user has the option of adding more tasks to the list, marking the tasks that have been completed, or removing tasks from the list. The CPU 40 (shown in FIG. 3) stores the To-do list in the storage 42 (shown in FIG. 3) for retrieval at a later time. The system may include the possibility of accessing the data via a web server that keeps a secure copy of the data on the storage 42. Referring to FIG. 11, the DONE button 132 displays a clock 133 or a calendar depending on a user preference on the screen display 62.

Figure 12:
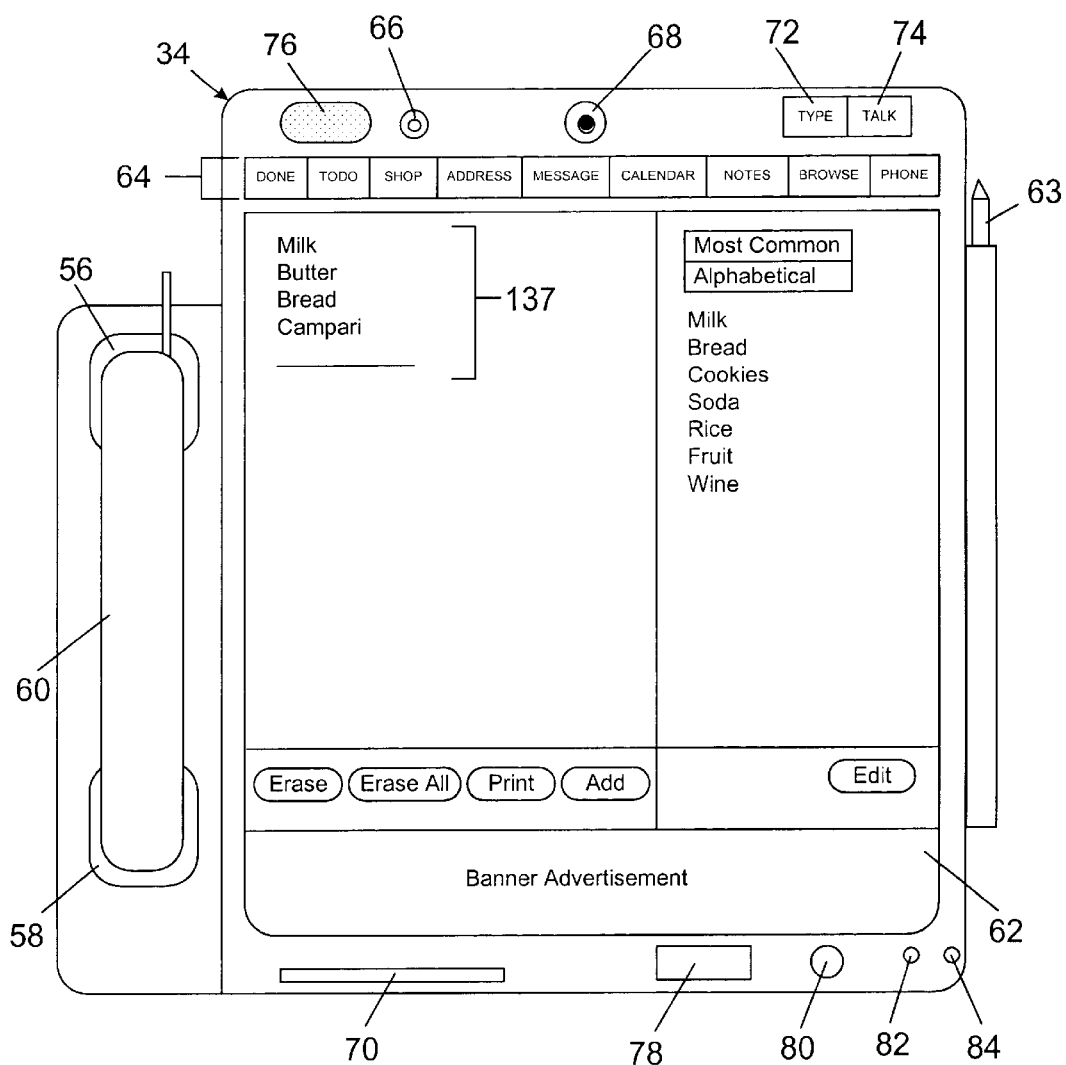
FIG. 12 shows a shopping list on a screen display of the information pad previously shown in FIG. 4 in accordance with one embodiment of the invention.
Figure 13:
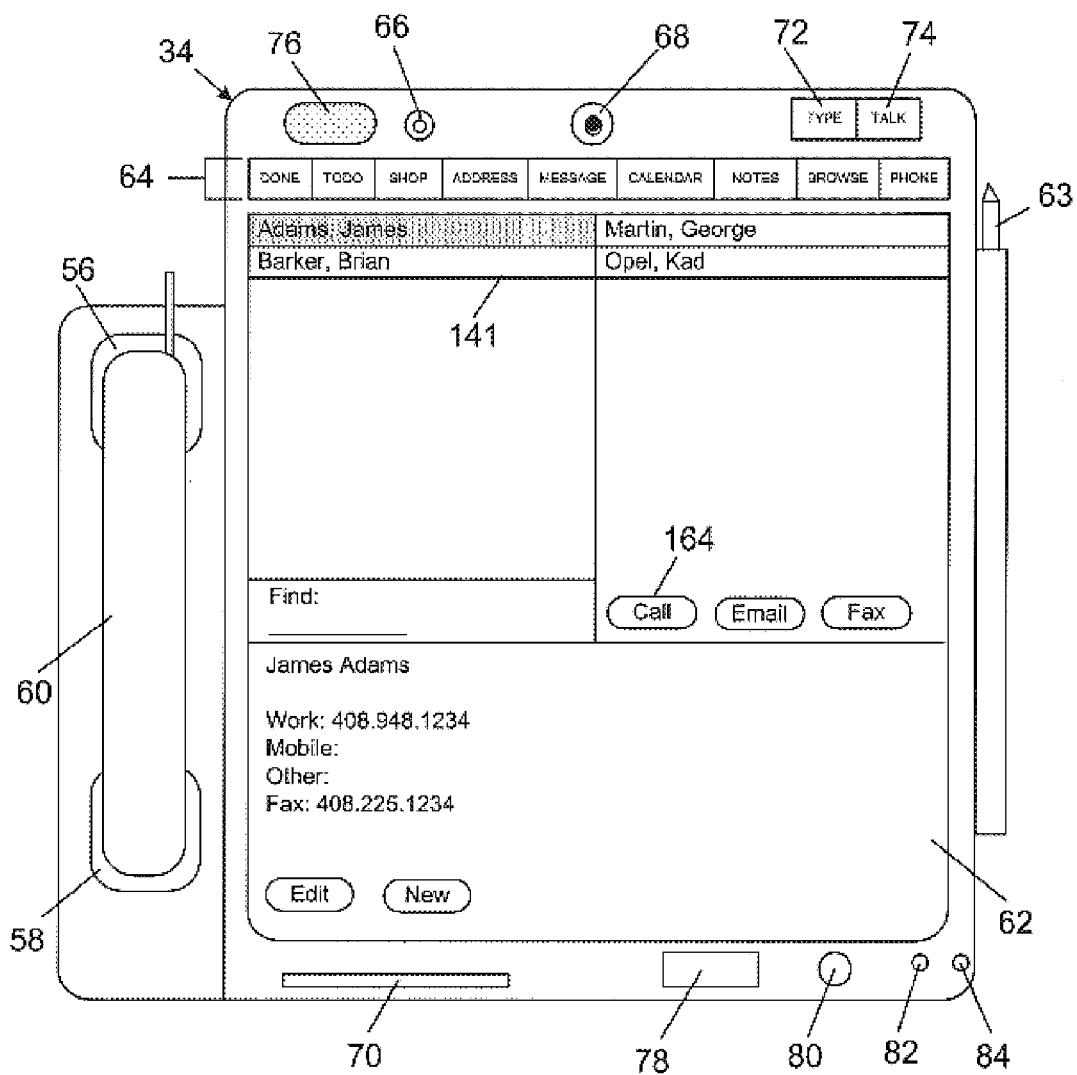
FIG. 13 shows an address book on a screen display of the information pad previously shown in FIG. 4 in accordance with one embodiment of the invention.

Referring back to FIG. 9, a user may press the SHOP button 136 to start up a shopping application. As illustrated in FIG. 12, the shopping application may display a shopping list 137 previously created by the user on the screen display 62. A list of online supermarkets may also be displayed in conjunction with, or as an alternative to, the shopping list. Referring back to FIG. 9, when the ADDRESS button 138 is activated, an address-book application starts up. As illustrated in FIG. 13, the address-book application displays an address book 141 on the screen display 62. The user can then search for a specific person in the address book, add other people to the address book, or dial or send a message to a selected person in the address book. Referring back to FIG. 9, the CALENDAR button 142 starts up an organizer (not shown) in which the user can schedule and edit activities.

The NOTES button 144 allows the user to interact with scanned documents and to make notes. When a document is scanned, the system uses an intelligent recognizer (not shown) to determine the type of content and action based on the type found. The recognizer uses a combination of optical character recognition (OCR) and contextual information to distinguish between addresses, appointments, and plain text. If an address is found, the system prompts the user to insert the entry in the address book using as many of the address fields as were found in the scan. Similarly for appointments, the system will prompt the user to insert the found fields in the calendar. If plain text is found in the scanned document, the user is asked if the original image, the converted text, or both are to be stored. For example, the converted text could be used as the body of an email message. The BROWSE button 146 establishes a connection to a network through the network adapter 44 (shown in FIG. 3). The APPS button 150 displays a menu of applications available through the system. The PREV button 152 and the NEXT button 154 allows the user to move through different sections of an application displayed on the screen display 62 of the information pad 34 (shown in FIG. 4).

The MESSAGE button 140 displays a message center (not shown) on the screen display 62 (shown in FIG. 4) when activated. The user then has the option of retrieving or sending a voice, email, or fax message through the message center. To send a fax, the user may place a document to be faxed on the reflective plate 86 and press the SCAN button 116 located on the electronic cradle 36 (shown in FIG. 6). The CPU 40 (shown in FIG. 3) responds to the signal from the SCAN button 116 and sends a control signal to the stepper motor 96 to move the optical scanner 97 along the reflective plate 86 so that the image on the reflective plate 86 can be scanned. The information pad 34 (shown in FIG. 4) may function as a cover for the reflective plate 86 if the user requires it. The scanned image is stored in the storage 42 (shown in FIG. 3) so that the CPU 40 can access it. A visual representation (not shown) of the scan appears on the display screen 62 with options for sending the visual representation to another user. The visual representation can be accessed at a later time by pressing the NOTES button 144 (shown in FIG. 9). After the user elects to fax the visual representation, the user enters a fax number using the standard input methods, e.g., by pressing the TYPE button 72 and using a virtual keypad (not shown) displayed on the display screen 38, by pressing the TALK button 74 and saying the name of a person in the user's address book, or by selecting a name from the user's address book. A message is then sent to the CPU 40 to send the fax.

Figure 14:
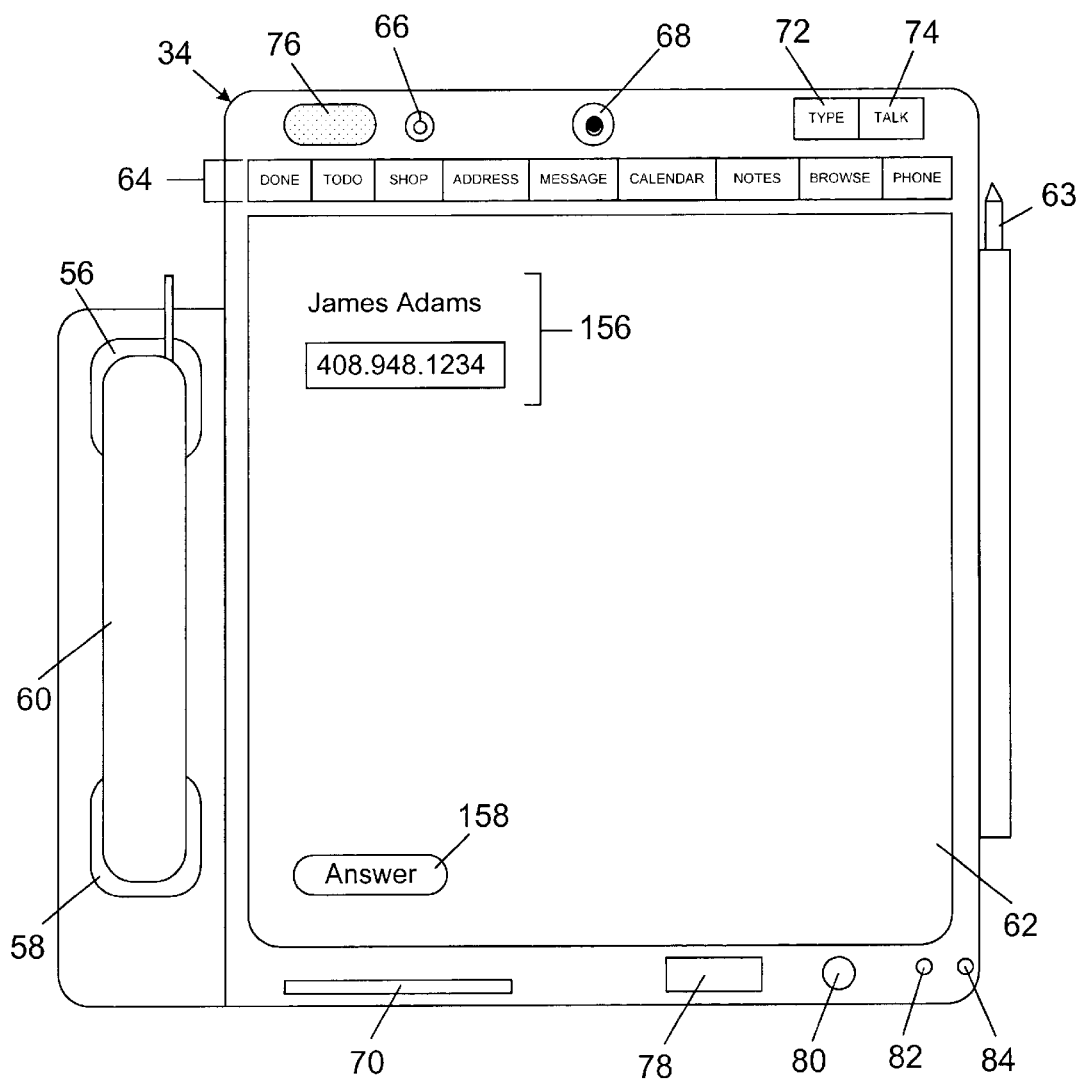
FIG. 14 shows the screen display of the information pad when a ring tone is heard.

The PHONE button 148 activates the phone service for making outgoing phone calls. The user has three options for answering the phone when a ring-tone is heard on the electronic cradle 36 and/or the hand-held phone 60. When a ring-tone is heard, the screen display 62 lights up, as shown in FIG. 14, and may show a caller identification 156 and action buttons, e.g., "ANSWER" button 158. The user can then answer the phone using the hand-held phone 60, the microphone array 70 and speaker 76 on the information pad 34, or the microphone 110 and speakerphone 102 on the electronic cradle 36. If the hand-held phone 60 is mounted on the information pad 34 when the ring-tone is heard, the user can lift the hand-held phone 60 and speak to the caller through the hand-held phone 60. If the hand-held phone 60 is not mounted on the information pad 34 when the ring tone is heard, the user can press a TALK button on the hand-held phone 60 to talk to the caller. All other speakers and microphones in the system are inactive when the hand-held phone 60 is in use. Instead of using the hand-held phone 60, the user may press the SPEAKER button 104 on the electronic cradle 36 and talk to the caller through the microphone 110. The caller's voice is heard on the speakerphone 102 in this case. Alternatively, the user may select the ANSWER button 158 and talk to the caller through the microphone array 70. In this option, the caller's voice is heard on the speaker 76 on the information pad 34.

Figure 15:
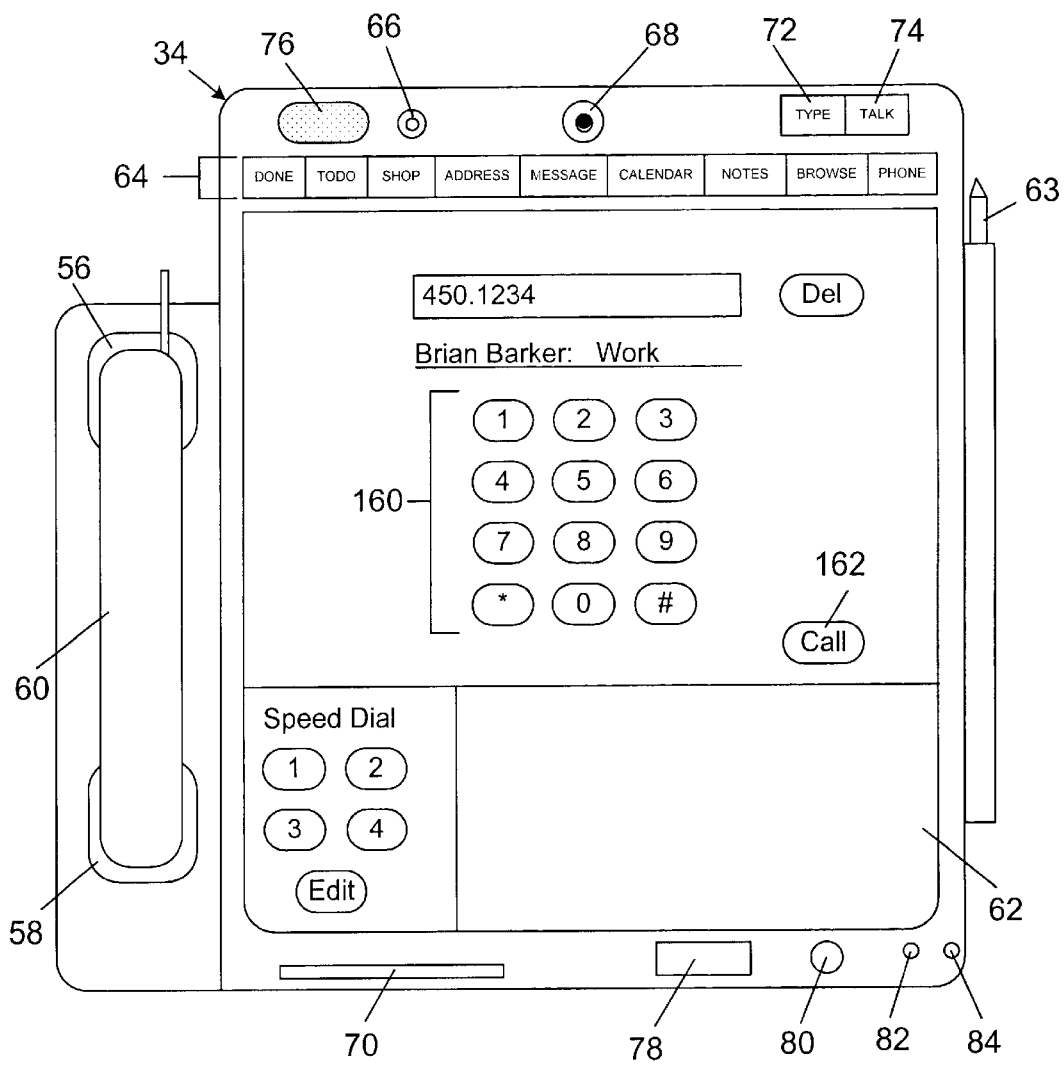
FIG. 15 shows a phone dialer screen on the screen display of the 10 information pad previously shown in FIG. 4.

A number of options are available for making a phone call with the system. In the default configuration, the information pad 34 is mounted on the electronic cradle 36, and the hand-held phone 60 is mounted on the information pad 34. To make a call, the user lifts the hand-held phone 60 from the information pad 34. When the hand-held phone 60 is lifted from the information pad 34, the screen display 62 lights up and shows a phone dialer screen, as illustrated in FIG. 15. The user then has four options for dialing a phone number. Option A involves using the keypad on the hand-held phone 60 to dial the number. The call is automatically completed after the number is dialed. Option B involves using a virtual keypad 160 on the screen display 62 to dial a number. A "CALL" button 162 is selected to complete the call. Option C involves pressing the TALK button 74 on the information pad 34 or the TALK button on the hand-held phone 60 and speaking the name of someone in the user's address book. The system confirms the name of the person and dials the number.

Instead of lifting the hand-held phone 60 from the information pad 34, the user may press the SPEAKER button 104 on the electronic cradle 36. When the SPEAKER button 104 is activated, the screen display 62 lights up, just as with lifting the hand-held phone 60. The user can then use one of Options B, C, or D described above to make a call. The user interacts with the person dialed using the speakerphone 102 and the microphone 110 on the electronic cradle 36. Instead of lifting the hand-held phone 60 from the information pad 34 or pressing the SPEAKER button 104, the user may press the ADDRESS button 138 on the information pad 34 and move to the desired name. The user may then press a "CALL" button 164 (shown in FIG. 13) on the screen display 62 to instruct the system to make the call. In this case, the user interacts with the person dialed through the microphone array 70 and speaker 76 on the information pad 34 unless the phone handset is activated.

In another configuration, the hand-held phone 60 and the information pad 34 are separated from the electronic cradle 36. In this case, the user can make a call by picking up the hand-held phone 60 as previously described. If the hand-held phone 60 is missing, the PHONE button 148 on the information pad 34 can be activated to make a call. When the user activates the PHONE button 148, the phone dialer screen is displayed on the screen display 62. The user may then enter a phone number to dial using the virtual keypad 160 or by pressing the TALK button 74 on the information pad 34 and speaking the name of someone in the address book. The user may also press the ADDRESS button 138, scroll to a desired name, and select a person to call. If the hand-held phone 60 is missing, the user interacts with the person dialed through the microphone array 70 and the speaker 76 on the information pad 34. In other embodiments of the invention, the hand-held phone 60 can be replaced with a headset (not shown) and microphone (not shown). The methods for answering and making a call using the headset/microphone will be the same as outlined above for the hand-held phone 60.

The invention provides availability of electronic organizer applications, communication appliances, and Internet browsers in a shared physical space such as a family's kitchen. The integrated information appliance allows scanned documents to be mailed electronically and information to be entered or scanned into the system, e.g., the address book. The information appliance turns on instantly and allows voice input as an alternative to text input. Calls, faxes, and emails can be sent directly from an address book displayed on the screen display of the appliance. The address book can be edited while talking on the phone. Banner advertisements are optionally available to the user through the system to reduce monthly service charges.

Figure 1:
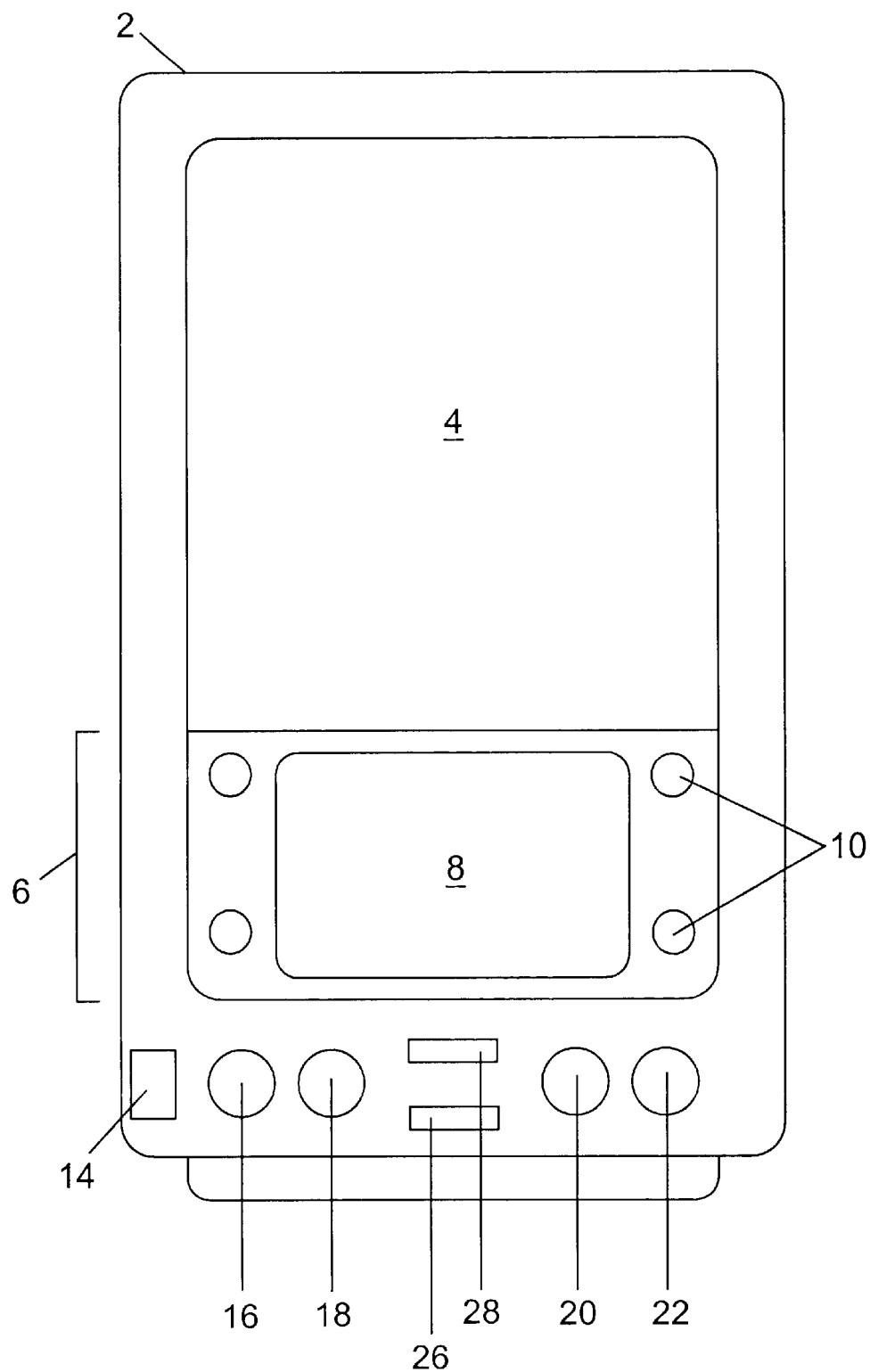
FIG. 1 is an illustration of a prior art palmtop computer system.

While the invention has been described with respect to a limited number of embodiments, those skilled in the art, having the benefit of this disclosure, will appreciate that other embodiments can be devised which do not depart from the scope of the invention as disclosed herein. For example, the electronic cradle 36 (shown in FIGS. 6 and 8) may include a radio transmitter/receiver (not shown) which can communicate with the portable computer 32 (shown in FIG. 2) wirelessly. The portable computer 32 could then be located anywhere, for example, near a power source and phone jack in the basement. In one embodiment, it may be possible, depending on the size of components, to combine the portable computer 32 and the electronic cradle 36 into one unit. The present invention is not limited to a single information pad 34. A number of information pads could communicate with the portable computer 34. Information pads could be placed at various locations around the house. These additional information pads would need a cradle for charging their batteries. Another embodiment could replace the phone base station 50 and cable 53 (shown in FIG. 2) with a cellular phone. This would eliminate the need to attach a cable 53 from the portable computer 32 to a phone jack in the wall 47 (shown in FIG. 1). Yet another embodiment could replace the phone base station 50 and cable 53 with a Voice over IP (VoIP) implementation, i.e., the Internet connection could be used to make phone calls. Other embodiments which do not depart from the scope of the invention are possible. Therefore, the scope of the invention should be limited only by the attached claims.

What is claimed is:

1. An integrated information appliance comprising:
a central processing unit for executing an action in response to a user request;
a storage for storing information for use by the central processing unit in responding to the user request;
a cradle comprising an integrated scanning device for scanning an image and storing the scanned image in the storage; and
an information pad removably mounted on the cradle, the information pad comprising a screen display for displaying information to a user and for receiving information and requests from the user and a plurality of application buttons for sending a request to the central processing unit to perform a specific action.

2. The integrated information appliance of claim 1, further comprising a phone base station and a phone which receives communication signals from the phone base station.

3. The integrated information appliance of claim 2, further comprising a network connection means for converting information from the appliance to a form suitable for transportation over a network.

4. The integrated information appliance of claim 1, further comprising a printer connected to receive print requests from the central processing unit.

5. The integrated information appliance of claim 4, wherein the printer is coupled to the cradle.

6. The integrated information appliance of claim 1, further comprising a mounting member coupled to the cradle for mounting the cradle to a surface.

7. The integrated information appliance of claim 6, wherein the mounting member is a magnet.

8. The integrated information appliance of claim 1, wherein the information pad further includes a microphone for receiving voice input from the user.

9. The integrated information appliance of claim 8, further including voice recognition means for translating the voice input to commands executable by the central processing unit.

10. The integrated information appliance of claim 1, wherein the cradle comprises a fastening device engagable with a recess in a bottom surface of the information pad.

11. The integrated information appliance of claim 1, wherein, when the information pad is removably mounted on the cradle, a rear planar surface of the information pad is substantially parallel with a front planar surface of the cradle.

12. An integrated information appliance comprising:
a central processing unit for executing an action in response to a user request;
a storage for storing information for use by the central processing unit in responding to the user request;
a cradle comprising a scanning device for scanning an image and storing the scanned image in the storage;
an information pad removably mounted on the cradle, the information pad comprising a screen display for displaying information to a user and for receiving information and requests from the user and a plurality of application buttons for sending a request to the central processing unit to perform a specific action; and a phone base station and a phone which receives communication signals from the phone base station, wherein the phone is detachably coupled to the information pad.

13. An integrated information appliance comprising:

a central processing unit for executing an action in response to a user request;

a storage for storing information for use by the central processing unit in responding to the user request;

a cradle comprising a scanning device for scanning an image and storing the scanned image in the storage;

an information pad removably mounted on the cradle, the information pad comprising a screen display for displaying information to a user and for receiving information and requests from the user and a plurality of application buttons for sending a request to the central processing unit to perform a specific action;

a phone base station and a phone which receives communication signals from the phone base station; and a network connection means for converting information from the appliance to a form suitable for transportation over a network, wherein the central processing unit, the storage, the network connection means, and the phone base station are connected to a motherboard.

14. The integrated information appliance of claim 13, wherein the motherboard is electrically coupled to the cradle.

15. The integrated information appliance of claim 14, further comprising a power supply connected to the motherboard so as to supply electrical power to the appliance.

16. The integrated information appliance of claim 14, wherein the information pad includes a first communication port which cooperates with a second communication port on the cradle so as to establish a communication channel between the central processing unit and the information pad.

17. The integrated information appliance of claim 16, wherein the first communication port and the screen display are connected to an interface board.

18. The integrated information appliance of claim 17, further comprising a first wireless receiver/transmitter connected to the interface board and a second wireless receiver/transmitter connected to the motherboard, the first and second wireless receivers/transmitters providing wireless connection between the information pad and the central processing unit when the information pad is detached from the cradle.

19. The integrated information appliance of claim 18, wherein the information pad further includes a first battery pack connected to the interface board, the first battery pack for supplying power to the screen display when the information pad is detached from the cradle.

20. The integrated information appliance of claim 19, wherein the information pad further includes contact tabs for charging a battery pack in the phone.

21. The integrated information appliance of claim 17, further including a transmitter/receiver port connected to the interface board so as to allow the appliance to exchange information with an electronic device.

22. An integrated information appliance comprising:

a central processing unit for executing an action in response to a user request;

a storage for storing information for use by the central processing unit in responding to the user request;

a cradle comprising an integrated scanning device for scanning an image and storing the scanned image in the storage;

an information pad removably mounted on the cradle, the information pad comprising a screen display for displaying information to a user and for receiving information and requests from the user and a plurality of application buttons for sending a request to the central processing unit to perform a specific action;

a phone base station in communication with the central processing unit; and a phone which receives signals from the phone base station.

* * * * *